United States Patent
Zenger et al.

[15] 3,686,820
[45] Aug. 29, 1972

[54] AUTOMATED HANDLING SYSTEM FOR ARTICLES

[72] Inventors: Richard D. Zenger; Albert F. Lewis, both of Chicago, Ill.

[73] Assignee: National Can Corporation, Chicago, Ill.

[22] Filed: April 16, 1970

[21] Appl. No.: 29,131

[52] U.S. Cl. .............................53/3, 53/28, 53/180, 53/381 R, 206/46 BC, 206/56 A, 214/305, 221/25
[51] Int. Cl........B65b 9/02, B65b 69/00, G07f 11/66
[58] Field of Search..................53/28, 180, 3, 381 R; 206/56 A, 56 AA, 56 AB, 56 AC; 214/305, 306; 221/25, 26, 69–71; 222/83.5

[56] References Cited

UNITED STATES PATENTS

| | | | |
|---|---|---|---|
| 2,503,518 | 4/1950 | Slaughter | 53/28 |
| 2,747,346 | 5/1956 | Tigerman et al | 53/28 |
| 3,410,450 | 11/1968 | Fortenberry | 221/71 X |
| 2,885,071 | 5/1959 | Rodnon | 206/56 X |
| 3,181,734 | 5/1965 | Ensign | 222/83.5 |
| 3,394,798 | 7/1968 | Sako | 221/25 X |
| 3,407,916 | 10/1968 | Engeler | 198/34 X |

FOREIGN PATENTS OR APPLICATIONS

| | | | |
|---|---|---|---|
| 1,053,915 | 1/1967 | Great Britain | 53/184 |

*Primary Examiner*—Theron E. Condon
*Assistant Examiner*—Neil Abrams
*Attorney*—Robert J. Doherty

[57] ABSTRACT

A system for heating articles of disc-like or other nestable and geometric configurations which includes method and apparatus for arranging the articles into a plurality of spaced groups in nested relation to each other encasing the articles in a plastic film to produce a plurality of spaced stacks of interconnected articles, delivering the interconnected articles to a subsequent location, severing the plastic film to accommodate removal of each of the stacks of articles, and delivering each of the stacks of articles in end-to-end relationship for movement along a second path.

36 Claims, 10 Drawing Figures

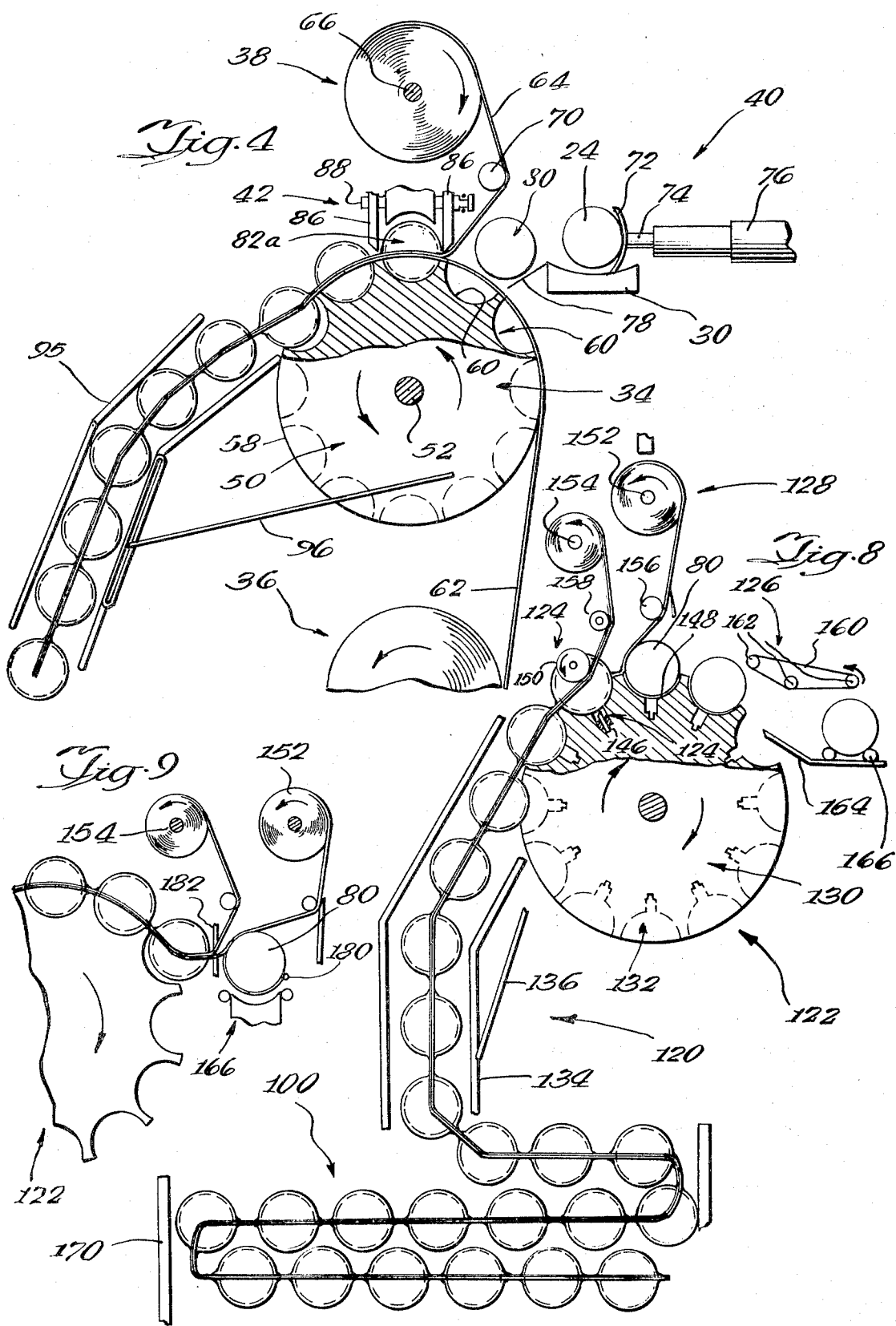

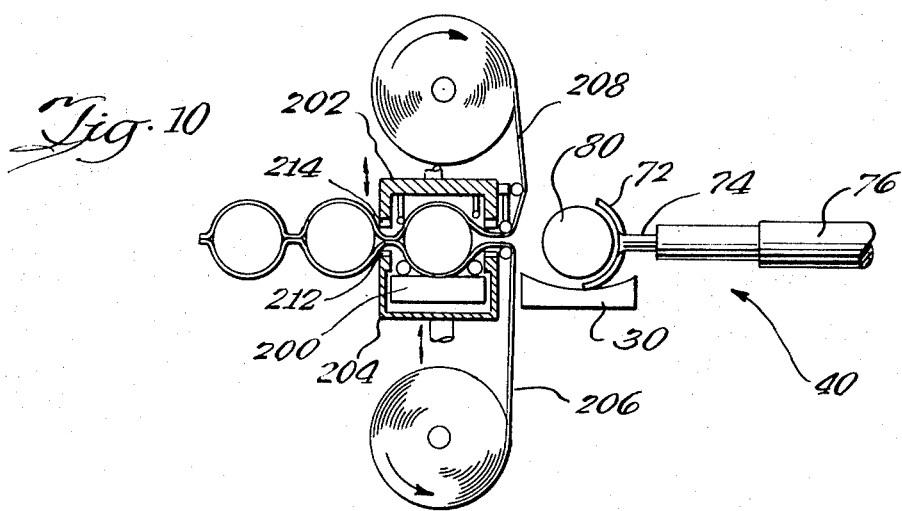
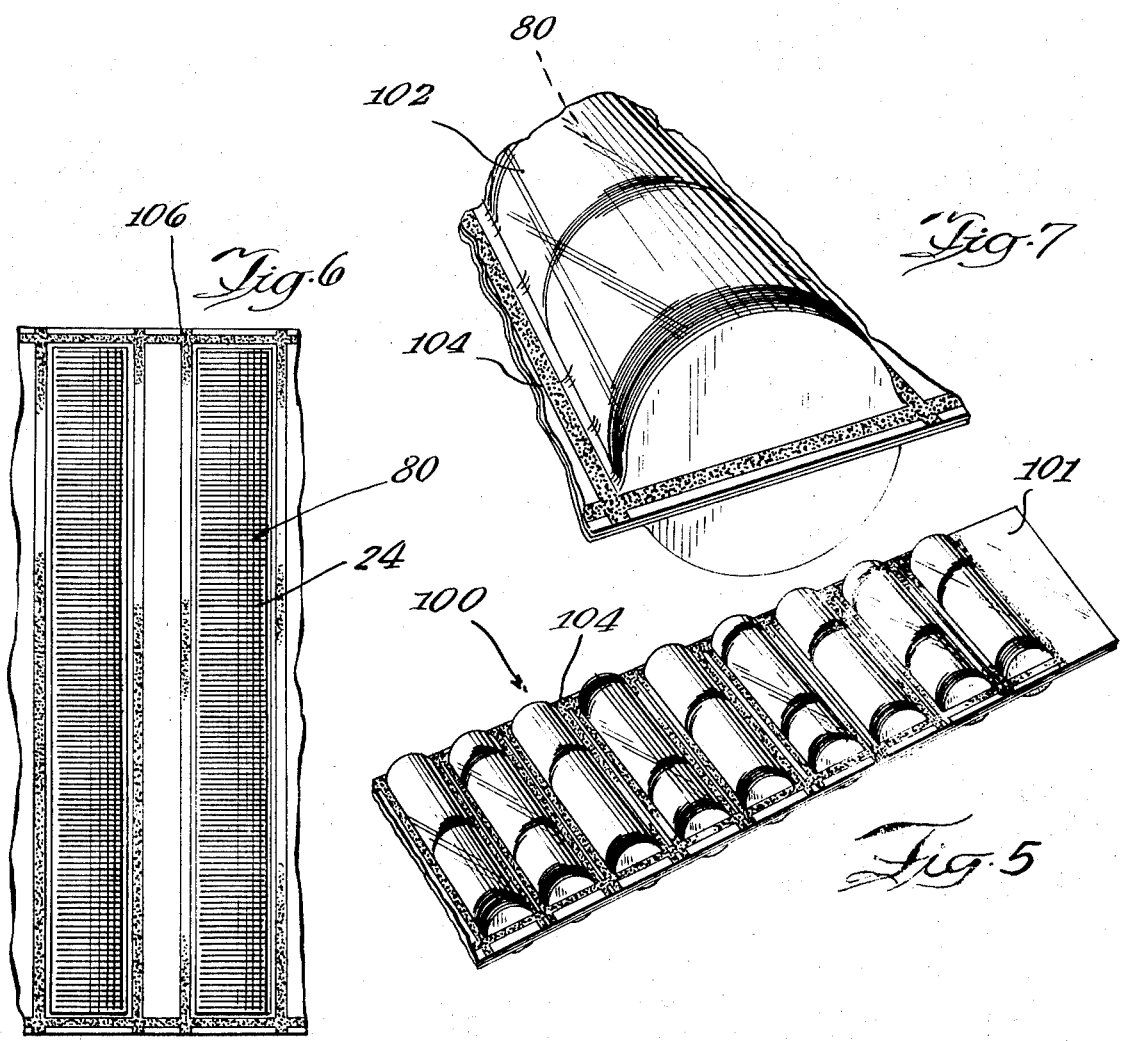

AUTOMATED HANDLING SYSTEM FOR ARTICLES

One embodiment of the packaging mechanism is illustrated as a rotating drum having a plurality of pockets formed on the peripheral surface thereof. A continuous supply of first and second sheets is delivered to the peripheral surface of the drum in superposed relationship and successive stacks of articles are delivered to each of the pockets. Subsequently, the heat sealable sheets are sealed around the entire circumference of each of the stacks of articles to completely encase the stack by the plastic film. The stacks of articles are then arranged in superposed rows and are banded for shipment to a subsequent location.

The packaging results in an article in which the respective sheets form a plastic film having an encompassing portion for each stack of articles and a connecting portion between adjacent ends of each pair of stacks with the connecting portion accommodating bending of the film to allow the groups of stacks to be arranged in superposed rows for banding.

At the subsequent location, the respective stacks of articles are fed to an unpackaging apparatus where one of the plastic sheets is severed along each of the stacks while maintaining a continuous connection between the remainder of the film and the respective stacks are delivered to a second path and arranged in end-to-end relationship for feeding a subsequent machine while the sheets are collected for disposal.

BACKGROUND OF THE INVENTION

The present invention relates generally to method and apparatus for handling nestable articles and, more particularly, to a method and apparatus for packaging such articles at one location and unpackaging the articles at a second location for delivery to a machine.

In the manufacture of containers, it is customary to manufacture the main body of the container at one location and to manufacture the ends for the container at another location. The container ends are then packaged for shipment to various plants at which the ends are seamed to the opposite ends of the container body to produce the completed container.

At the present time, it is customary to form, curl and compound line the container ends in a machine and deliver the ends from the compound lining machine in a manner to produce a continuous stack of ends disposed in face-to-face relationship. An operator is stationed at the end of the continuous stack and intermittently manually removes a predetermined number of ends from the endless stacks and locates the predetermined number of ends in a tray. Subsequently, the operator slips a paper sleeve or bag over the stack of ends.

A plurality of stacks of ends, respectively encased in paper bags, are then stacked in boxes or on pallets and are banded for shipment to the assembly plant.

At the assembly plant, another operator manually removes each stack of container ends encased in the paper sleeve or bag from the box or pallet and deposits the containers to a feeding mechanism for a seaming machine.

With the present emphasis on increased productivity in various phases of the container using industry, some users of containers of the above type have present facilities for seaming container ends onto the main body of the container at a rate of at least 1,100 container ends per minute. Additionally, machinery is presently being designed that, it is hoped, will result in seaming container ends at a rate of 2,000 ends per minute. Since the nature of the ends generally limits the number of ends in each paper sleeve to approximately 250, it becomes increasingly more difficult for a single operator to maintain a sufficient supply of container ends in a position for being fed into a seaming machine.

Another problem encountered in the present day method of packaging container ends relates to contamination. Many of the present day soft drink and beer manufacturers utilize metal cans as containers for such products. In this industry, it is essential that the container ends be delivered to the brewery in a clean condition. This problem is aggravated by the fact that many times the container ends are stored for a considerable period of time.

While various proposals have been made for improving the packaging of articles, such as container ends, these alternatives have not been commercially accepted because they were either economically unfeasible or the necessary machinery required for utilization of such methods was extremely complicated and expensive.

Thus, there still remains a need for a simple and effective method for handling container ends from the time they are delivered from the compound lining machine until they are fed into the seaming machine.

SUMMARY OF THE INVENTION

The present invention contemplates improved method and apparatus for handling container ends automatically from the time they are delivered from the compound lining machine until such time as they enter the seaming machine.

The method of handling articles, such as container ends, contemplates arranging the disc-like articles in face-to-face relationship in a plurality of spaced stacks and encasing the stacks in a film of flexible material with the material maintaining a connection between adjacent stacks. The plurality of interconnected stacks are then arranged in superposed rows by bending the flexible material at spaced locations and the resultant groups of stacks are banded or otherwise secured together for shipment.

The completed package thus includes a large number of container ends arranged in a plurality of longitudinally spaced stacks, each having a plurality of ends in face-to-face relationship, with a flexible, impervious material having an encompassing portion for each stack and a connecting portion between adjacent pairs of stacks so that all of the stacks are interconnected and the connecting portions accommodate bending of the film between any pair of adjacent stacks. Furthermore, the completed package results in all of the container ends being completely sealed from the surrounding atmosphere to prevent any contamination of the articles during shipment and during storage.

The banded articles are then shipped to a subsequent location, such as a plant which produces the finished containers. At the plant, the stacks of articles are automatically removed and delivered to a seaming machine by severing the material along each of the stacks to accommodate removal of each stack of articles from the package. The exposed articles or container ends are maintained in face-to-face relationship and are delivered to a second path to produce a continuous supply of articles to another machine.

More specifically, the method of unpackaging the articles contemplates the steps of moving the film or encasing material with the articles enclosed therein along a path, severing the material along each of the stacks while maintaining a connection between the remainder of the material, collecting the encasing material or film at a collection station to expose each of the stacks of articles, supporting the exposed stack of articles, and ultimately delivering the articles to a path to produce a continuous supply of articles.

The apparatus for handling the articles includes a machine or means for encasing the spaced stacks between first and second sheets at a first location and a second machine or means at a second location for removing the stacks from the sheets and arranging the stacks in end-to-end relation to produce a continuous supply of said articles at the second location.

The machine for encasing the stacks of articles includes support means for the articles, delivery means for sequentially delivering stacks of articles in face-to-face relation to the support means, means for delivering first and second sheets of sealable material adjacent said support means in superposed relation with the respective stacks being received between the two sheets, and securing means for sealing the sheets together along opposite sides and opposite ends of each of the stacks to produce an article having a plurality of completely encased stacks. The plurality of interconnected stacks are then received into a movable guide means for arranging groups of stacks in superposed rows for shipment.

The unpackaging machine includes means for moving the stacks and film along a path with a mechanism for severing the encompassing portion of the film along each stack in a manner that the adjacent connecting portions remain interconnected, a roller for collecting the film in a readily disposable fashion, and means for delivering the plurality of stacks from the first path to a second path for ultimate feeding of a continuous supply of articles to a machine.

BRIEF DESCRIPTION OF THE SEVERAL VIEWS OF DRAWINGS

FIG. 4 is an end view, partly in section, of the packaging apparatus shown in FIG. 3;

FIG. 5 is a fragmentary perspective view of a package of container ends formed by the apparatus of FIGS. 3 and 4;

FIG. 6 is an enlarged fragmentary plan view of the package shown in FIG. 5;

FIG. 7 is an enlarged perspective fragmentary view of the package shown in FIG. 5;

FIG. 8 is an end view, partly in section, of the unpackaging apparatus forming part of the present invention;

FIG. 9 is a fragmentary view similar to FIG. 8 showing a slightly modified form of the unpackaging apparatus; and FIG. 10 is a modified form of the packaging apparatus forming part of the present invention.

DETAILED DESCRIPTION

Figure 1:
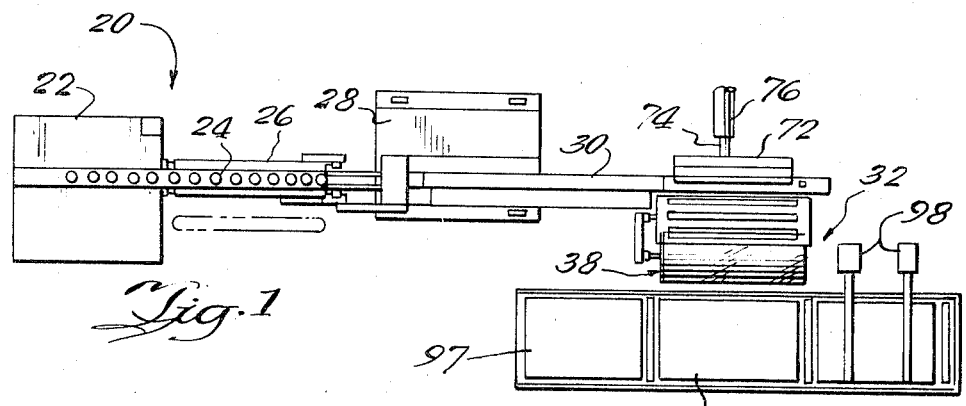
FIG. 1 shows a plan view of the last stage of operation of forming a container end and disclosing the present invention arranged to receive the container ends.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Figure 2:
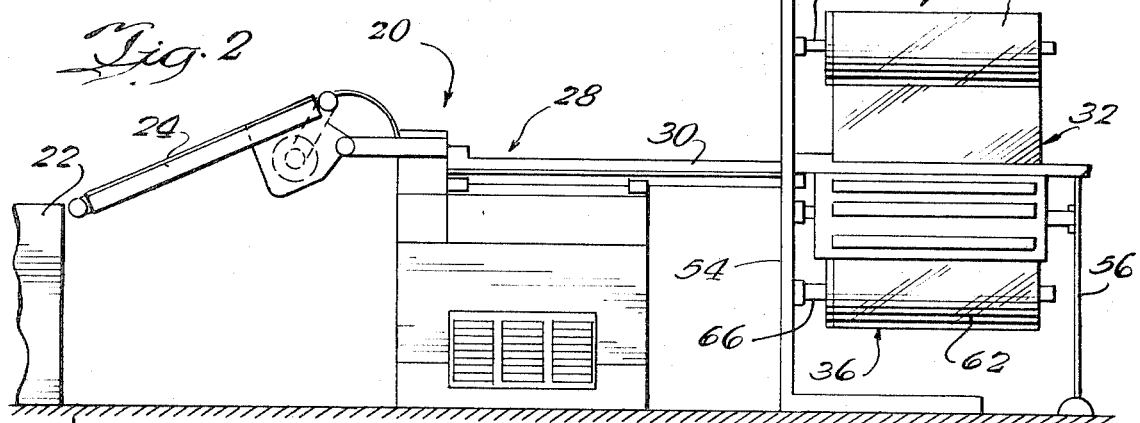
FIG. 2 is a side elevational view of the system disclosed in FIG. 1.

The last stage in the formation of the container ends is illustrated in FIGS. 1 and 2 of the drawings and is generally designated by the reference numeral 20. The last stage in the container end formation process includes a sealing compound applying machine or apparatus 22 which delivers a plurality of container ends 24 to a conveyor 26. The finished container ends 24 are received into a stacking mechanism 28, such as a commercially available Fleetwood Systems aerodynamic stacker, manufactured by Fleetwood Systems, Inc., LaGrange, Ill. The stacker 28 takes the individual horizontally positioned ends and arranges the ends in a vertical position so as to be nested in face-to-face relationship to form a continuous stack along a support track, generally designated by the reference numeral 30.

As was indicated above, heretofore it has been common practice to have an operator located adjacent the end of the stacker 28 who would periodically remove a predetermined number of ends from the track 30 and deliver the ends to a bagger tray disposed adjacent the track 30. The operator would then physically telescope a paper sleeve over the group of container ends and close the end of the paper sleeve for shipment.

However, according to the present invention, the necessity of having an operator located adjacent the stacker 30 is eliminated and the packaging of the container ends is performed automatically by mechanism which will now be described.

The packaging mechanism is generally designated by the reference numeral 32 in FIGS. 1 and 2. The packaging apparatus or system includes support means 34 (FIG. 4) for receiving a plurality of stacks of articles, first and second means, 36 and 38, for supplying first and second sheets of heat sealable film in superposed relation adjacent the support means 34, delivery means 40 for intermittently delivering stacks of articles between the sheets onto the support means; and heat sealing means 42 for sealing the two sheets together between the adjacent stacks of articles received between the respective sheets.

Figure 3:
FIG. 3 is a side elevation view of the packaging mechanism forming part of the present invention.

The article support means 34 is more clearly shown in FIGS. 3 and 4 and includes a drum 50 supported for rotation on a shaft 52 extending between spaced supports 54 and 56 (FIG. 2). The peripheral surface 58 of the drum has a plurality of circumferentially spaced pockets or recesses 60 formed therein. Each of the recesses 60 is adapted to receive and support a stack of disc-like articles supported on end for packaging.

The mechanism for packaging the plurality of articles 24 includes first and second flexible, sealable sheets 62 and 64, respectively, delivered from the supply means 36 and 38. Each of the supply means may take the form of a continuous supply of flexible material supported on a roll carried by a shaft 66 extending from the vertical support 54. In the illustrated embodiment, the first supply means 36 is located below the shaft 52 which supports the drum 50 and the sheet 62 is trained over the peripheral surface 58 of the drum 50. The second supply means 38 is located above the article support 34 and the sheet 64 supplied therefrom extends over an idler roller 70 so that the two sheets end up in substantially superposed relation adjacent the article receiving station of the drum 50.

The delivery means 40 of the packaging system 32 is illustrated (FIGS. 1 and 4) as an arcuate plunger 72 having a length substantially equal to the length of the stack which is to be supplied to the article support means 34, as will become more apparent hereinafter. The plunger 72 is supported on a portion of the track 30 and has the free end of a piston rod 74 fixedly secured thereto. The piston rod 74 is reciprocated within a cylinder 76 having its head end secured to a stationary support. The delivery means further includes an inclined chute or guide 78 extending from the one edge of the track 30 towards the article support means 34 at the receiving station.

Thus, extension of the piston rod 74 relative to the cylinder 72, through a pressured fluid source (not shown), will physically transmit a plurality of articles disposed in face-to-face relationship with the length of the stack being equal to the length of the plunger or pusher 72. During extension of the piston rod 74, a stack of articles 80 will be forced onto the downwardly inclined guide 78 and will be received between the two sheets 62 and 64 and be deposited into one of the pockets or recesses 60. Preferably, the extension of the piston rod is controlled by an electronic detection device, such as an electric eye, which determines when a sufficient amount of ends are in alignment with the plunger. The device then feeds an impulse to a mechanism which supplies pressured fluid to the head end of cylinder 72.

When the stack 80 is received in the pocket 60, it will cause the lower sheet 62 to conform to the configuration of the pocket 60, as well as the peripheral surface of the container ends. A pocket 60 having just received the stack of articles 80 at the first position is then indexed to a second station for a heat sealing operation. In the second position, indicated by the reference numeral 82a, the subject stack of articles or container ends is encased between the respective sheets 62 and 64 to completely seal the ends from the surrounding atmosphere.

In the embodiment illustrated in FIGS. 2 through 4, the means 42 for encasing each of the stacks of articles 80 within the sheets 62 and 64 includes first and second heated rolls or discs 86 fixed to a shaft 88, which in turn is connected to a piston rod 90 reciprocating within a cylinder 91. The axial spacing between the discs 86 is slightly greater than the diameter of the disc-like articles or container ends 24. The fluid cylinder 91 is suitably supported adjacent the end of the drum 50 and is positioned so that extension and retraction of the piston rod 90, by supplying pressured fluid to opposite ends of the cylinder 91 through means (not shown), will cause the respective discs 86 to traverse the length of the drum 50 on opposite sides of a stack 82a to heat seal the sheets 62 and 64 together.

The heat sealing means 42 further includes first and second heated rolls 92 respectively rotatable with shafts 93 for heat sealing the opposite edges of the respective sheets to each other. The rolls 92 are capable of being moved from a first position spaced from the peripheral surface of the drum 50 to a second position in contacting engagement with a continuous segment 94 adjacent each end of the peripheral surface 58.

The packaging system further includes means for directing the packaged stacks of articles in superposed rows onto a pallet for banding and shipment. This means includes a guide or chute 95 for receiving the encased stacks from the support means 34 and directing the stacks into superposed rows with each row having a group of stacks, as shown in FIG. 8. The chute or guide means 95 is moved between opposite edges of a pallet 97, located below the open end of the chute 95, by an arm 96 cooperating with the drum. For this purpose, the free end of the arm and the adjacent end of the drum 50 may have a suitable cooperating cam and cam follower mechanism (not shown).

After a suitable number of stacks are received on the pallet to reach a predetermined height, an electronic detection device, such as a photocell, actuates a drive means for a conveyor supporting the pallet to move the loaded pallet to a banding station to be banded by a commercial banding mechanism 98.

While the stacks of articles are shown to be stacked on the pallet in horizontal rows, it is readily apparent that they could be positioned endwise on the pallet.

The operation of the packaging system forming part of the present article handling system will now be described. When a sufficient number of container ends are arranged in face-to-face relationship on the track or chute 30, pressured fluid is supplied to the head end of the cylinder 76 by an electronic detection device, which indicates that a sufficient number of container ends are in face-to-face relationship in the outlet of the stacker 28 to fill one of the pockets 60. The pusher or loader 72 then forces the stack 80 of articles 24 from the track 30 into one of the pockets 60. The article support means 34 or drum 50 is then indexed to move the pocket from the article receiving station to the article encasing station. During the indexing of the drum 50 the rolls 92 are placed in contacting engagement with the continuous surfaces 94 to heat seal the opposite edges of the sheets 62 and 64, which extend beyond the opposite ends of the stack of articles. The article stack is then completely encased by supplying pressured fluid to the cylinder 92 to move the heated rolls 86 the entire length of the drum 50 and heat seal the sheets 62 and 64 together along opposite sides of the stack 80a.

This operation is continued with the heated rolls 86 traversing the drum during each dwell cycle in which the stack of articles is at the encasing station and having the end rolls 92 in engagement with the surfaces 94 while the drum 50 is being indexed from one position to another.

The completed package of spaced stacks of container ends is guided along the chute or guide means 95 into a box or onto a pallet 97 with the guide chute being moved back and forth across the pallet by the arm 96 to position the respective stacks of articles in superposed rows, as is shown in FIG. 8.

When a predetermined number of stacks have been formed, which may be determined through a counter or photocell arrangement cooperating with the support drum, the counter will rapidly advance the drum 50 through several indexing positions so as to form a leader or extension on the trailing end of the interconnected stacks. After this is accomplished, the respective sheets are cut by any suitable mechanical or manually operated cutter so as to produce the ultimate package shown in FIG. 5. The completed package 100 shown in FIG. 5 includes a flexible film, defined by the first and second sheets 62 and 64 with the flexible film having an encompassing portion 102 for each of the stacks of articles 80 and a connecting portion 104. Furthermore, the heat sealing described above produces a continuous seal 106 which extends along opposite edges of the sheets and along opposite ends of each of the stacks 80, as is more clearly shown in FIG. 6. The leader or extension 101 will extend a substantial distance beyond the adjacent edge of the endmost stack of articles for a purpose which will be described later.

The use of the flexible film or sheets will accommodate bending of the film between adjacent stacks so as to readily arrange the package 100 into superposed rows of stacks shown in FIG. 8. The present packaging apparatus may readily incorporate, what may be termed, automated pelletizing. For example, if a total of 64 stacks were to be placed on each pallet, the chute could be arranged to deposit eight stacks in each superposed row and the counter cooperating with the drum 5D could be set for 64 units. After 64 stacks of articles were detected by the counter (not shown), the counter would energize the drum drive means to automatically rapidly advance the drum and form the leader 101 resulting in eight superposed rows of stacks on a pallet, each having eight spaced stacks of articles.

The counter could also be utilized to transfer the pallet and package to the banding station for automatic banding by the banders 98. For example, the counter could temporarily energize a suitable drive means of a pallet conveyor (not shown) for supporting the pallets 97. The filled pallet 97 would thus be moved to the banding station while an empty pallet would be placed in alignment with the packaging apparatus to repeat the operation.

Also, while it is only necessary to have one heat seal between adjacent stacks of articles, to increase the strength of the interconnecting portions, the heating of the flexible film will also cause some shrinkage of the encompassing portion of the sheets to aid in retention of the ends in the film.

The unpackaging apparatus forming part of the present invention is disclosed in FIG. 8, and is capable of receiving the package 100, automatically removing the container ends and delivering the container ends to a second path to produce a continuous supply of ends to a seaming machine. The unpackaging apparatus or means 120 includes feeding means 122 for feeding the package 100 along a path, severing means for severing the encompassing portion 102 of the film along each stack in a manner that the adjacent connecting portions 104 remain interconnected, delivery means 126 for delivering the stacks of articles to a second path wherein all of the stacks are in end-to-end juxtaposed relation and collecting means 128 for collecting the film that is removed from the respective stacks of articles.

In the illustrated embodiment of FIG. 8, the feeding means 122 for the package includes a drum 130 having a diameter substantially equal to the diameter of the drum 50 and having a plurality of pockets or recesses 132 defined on the peripheral surface thereof. The circumferential spacing of the pockets 132 is identical to the spacing of the pocket 60. The feed means 122 includes a movable guide 134 which guides the respective stacks of articles along a predetermined path from the superposed rows of stacks shown in FIG. 8. Again, the guide means 134 will be guided by an arm 136 and positioned by a cam roller and cam follower arrangement (not shown) cooperating between the end of the arm 136 and the drum 130, so that the lower open end of the guide or chute 134 will be moved between opposite sides of the row of articles.

The severing means 124 of the unpackaging system 122 includes first severing means in the form of a circular cutter 146 adapted to be received in a recess 148 which is in communication with a pocket 132. The severing means further includes suitable mechanism for moving the cutter the entire length of the stack 80 so as to sever or cut one of the sheets the entire length of the stack of articles 80 to thereby accommodate removal of the stack from the film forming the package. According to one aspect of the present invention, the film is severed along the encompassing portion 102 of each of the stacks in a manner that the adjacent connecting portions 104 of the package remain interconnected. This will result in all of the film being maintained in an interconnected fashion with the heat sealing providing the connections for the segment of the encompassing portion which is severed. This will allow the entire film to be collected at the collecting station 128 for subsequent disposal.

In order to completely open the package and allow ready removal of the article stacks 80, it is also desirable to remove the opposite heat sealed edges of each sheet that extends beyond the opposite ends of the respective stacks. For this purpose, the severing means 124 further includes a pair of cutters 150 (only one being shown) located on opposite ends of the respective stacks 80 and cooperating with the opposite end portions of the peripheral surface of the drum 130, so as to sever or continually remove the opposite edges of each of the sheets as the package is being fed along the path described above.

The opposite end portions of the film or the respective sheets, as well as the main body portion of the respective sheets, are collected at the collecting station 128 so as to be readily disposed. For this purpose, the collecting station or means 128 includes first and second shafts 152 and 154 supported for rotation above the drum 130 and driven by a common power source. The film of material is guided over idler rolls 156 and 158 located adjacent the peripheral surface of the drum 130.

The means 126 for delivering the exposed stacks of articles to a second path is illustrated as including a belt 160 rotated around a plurality of rollers 162, with one of the rollers being driven by a suitable power source (not shown) so that the moving belt 160 will engage an edge of the stack of articles and will force the articles from the pocket 132 onto an inclined chute 164 and ultimately deliver the articles to a second path, defined by an additional conveyor 166. The conveyor 166 may be of the type incorporated into a commercially available feed system referred to as the Fleetwood dual lane remote end feed system, manufactured by Fleetwood Systems, Inc., Lyons, Ill. The conveyor 166 will move the stack of articles axially of the path of rotation of the feed means 122 and will result in having the respective stacks of articles being arranged in end-to-end relation to form a continuous stack for supplying a subsequent machine, such as a seaming machine.

The operation of the unpackaging apparatus 120 will now be briefly described. The pallet with the plurality of transversely spaced and encased stacks of articles will be located in a confined area, such as a box 170, and the bands will be removed. Subsequently, the end of the package 100 having the extension or leader 101 thereon, which will be on the upper end of the respective rows of stacks on the pallet, will be attached to the respective shafts 152 and 154, which are located at the film collecting station 128.

The feeding means 122 will then be rotated and indexed to a position where the first stack of articles of the package 100 will be located in alignment with the cutter 146. As drum 130 is being rotated, the respective cutters 150 will sever the edges of the film and the synchronized rotation of the shafts 140 and 142 will result in having all of the film being collected in a very compact manner for subsequent disposal.

When the first stack 80 of articles is indexed in alignment with the cutter 146, the feed means 122 is stopped and the cutter 146 is traversed the entire length of the stack 80 to open the packaging film for the stack and allow removal of the stack from the encasing film.

This operation is continued with each pocket 132 of the drum being indexed to allow the severing of the lower sheet forming the film, along a path transverse to the path of movement of the stacks of articles. When the respective stacks of articles, supported within the pockets 132 are positioned in alignment and in engagement with the belt 160, the continuous rotation of the belt in the counterclockwise direction will remove the article stacks from the pockets and deliver the stacks to the conveyor 166.

Thus, it will be appreciated that the present invention provides a simple and effective manner for packaging a plurality of container ends in a manner that all of the present day equipment utilized for banding and shipping the container ends from one location to another may be utilized. Furthermore, the apparatus is very simple and inexpensive to manufacture and operate. The entire system can readily be incorporated into present day operations which utilize an operator for packaging the articles and an operator for unpackaging the articles. Additionally, the unpackaging of the articles is accomplished in a manner that the film of encasing material is automatically collected in a neat and compact manner and can easily be disposed of at any time. This is of considerable advantage when the operation is of the type where several thousand container ends are being seamed onto a container body during each minute of operation.

A slightly modified embodiment of the severing means 124 is disclosed in FIG. 9 and includes a first heated wire 180 which is disposed in the path of movement of the articles so as to heat the encompassing portion of the film sufficiently to sever the film along the entire length of each of the stacks 80. Also, the opposite edge of the film, which extends beyond the ends of the stacks 80, is likewise removed by having heated wires 182 (only one being shown) disposed adjacent opposite ends of the stack 80 so as to sever the continuous end portions of the heat seal.

Again, the end or edge portions, as well as the main body of the film, are collected on the shafts or rolls 152 and 154.

With the modified form of the invention, the rolls or shafts 152 and 154, more particularly, the roll 152, may be located at a point above the conveyor 166 so that the stacks 80 are located above the conveyor and the severing is accomplished by the heated wire 180 to deposit the stacks of articles directly onto the conveyor. Again, in this embodiment, it is desirable that the film be severed longitudinally along the encompassing portion of the film so as to maintain the interconnecting portions and the opposite side of the encompassing portion intact to allow collection of the main body of film at the collection station.

A slightly modified form of the packaging system of the present invention is disclosed in FIG. 10 and is in many respects similar to that disclosed and discussed in the embodiment illustrated in FIGS. 2–4. In the embodiment illustrated in FIG. 10, the article support means is in the form of a platform 200 supported adjacent the track or chute 30. The securing or heat sealing means in the modified embodiment includes a die having first and second elements 202 and 204, respectively, disposed above and below the sheets 206 and 208. The sheets 206 and 208 are fed in superposed relation above the platform or support means 200 and between the respective die elements. The die elements 202 and 204, each has a continuous heated surface 212 and 214 with the die elements being movable towards and away from each other by suitable means (not shown) so as to heat seal the entire encompassing area of the respective stacks 80. The respective stacks are again delivered to the support means 200 between the sheets 206 and 208 by the delivery means 40.

The operation of the modified packaging apparatus is believed to be apparent from the above description, but will now briefly be described. A plurality of articles 24 arranged in a stack 80 are intermittently fed between the sheets 206 and 208 onto the support member 200. The movement of the delivery means triggers the drive means for the die elements 202 and 204 to move the die elements from a position spaced from the respective sheets 206 and 208 into engagement with the respective sheets to heat seal the impervious plastic films or sheets 206 and 208 together around the entire periphery of each of the stacks 80. After the heat sealing is accomplished, the die elements are moved away from each other or to a retracted position and a suitable stripping mechanism (not shown) is operated to move the encased stack of articles from the support means 200. The support means 200 having portions of the sheets 206 and 208 located above the support will then be in position for receiving the next stack of articles 80 to repeat the operation. Again, the operation will continue in this manner until a sufficient number of stacks have been completely encased in the plastic film defined by the two sheets 206 and 208 to form the completed package 100 shown in FIG. 5.

Thus, it will be seen that the present system of handling disc-like articles eliminates the problems heretofore encountered in maintaining the articles free of contamination during storage and shipment since the impervious film completely encases the respective stacks of articles. Furthermore, the entire operation may readily be automated so as to eliminate an additional operator at the stacking station during the formation of the container ends and an operator at the unpackaging station when the container ends are delivered to a seaming machine.

What is claimed is:

1. A method of handling container ends and other nestable articles which comprises the steps of: arranging the container ends in face-to-face relation into a plurality of stacks; feeding said stacks in spaced relation along a first path thereby delivering stacks one-by-one to a support means at a packaging location; locating first and second sheets of flexible, impervious sealable material on opposite sides of the stack at said packaging location; and thereafter approaching opposite sides of and contacting said sheets with first and second sealing elements to seal said sheets together between said stacks and along opposite edges to completely enclose each of said stacks while on the support means, said first and second sealing elements being aligned together on opposite sides of said sheets adjacent said support means and relatively movable toward and away from each other, with at least one of said sealing elements being a heat sealing element.

2. A method as defined in claim 1, including the further steps of continuously feeding said ends in face-to-face relation along a second path; intermittently removing groups of said ends from said second path to form said plurality of stacks; and delivering each stack to said first path.

3. A method as defined in claim 2, in which said stacks are arranged in side-by-side relation in said first path.

4. A method as defined in claim 1, in which said sheets produce a connection between adjacent stacks.

5. A method as defined in claim 4, the further steps of delivering said plurality of interconnected stacks to a subsequent location; feeding said interconnected stacks along a second path at said subsequent location; and severing one of said sheets along each stack to accommodate removal of said ends.

6. A method as defined in claim 5, in which said sheets are collected on a roll after said ends are removed.

7. A method as defined in claim 4, including the further improvement of arranging said stacks into a plurality of superposed rows and banding said superposed rows for shipment.

8. A method of handling nestable articles such as container ends which comprises the steps of: arranging the articles in face-to-face relation into a plurality of spaced stacks; feeding the stacks in spaced relation along a path; encasing the spaced stacks in a film of flexible material with the material producing a connection between adjacent stacks; delivering said interconnected stacks to a subsequent location; severing said material along the ends of said stacks and also severing the material along one side only of each stack to accommodate removal of each stack of articles; and delivering said articles to a second path to produce a supply of articles to another machine.

9. A method as defined in claim 8, including the further steps of producing an extension of said material adjacent an outermost stack; feeding said extension to a collection station at said subsequent location, and collecting said material at said collection station after the articles are removed.

10. A method as defined in Claim 8, in which the step of severing said material along said ends is accomplished by continuous severing along said flexible material.

11. A method of handling container ends and other nestable articles arranged in face-to-face relationship in a plurality of spaced stacks and encased in a film of flexible material with said material maintaining a connection between said stacks, comprising: the steps of moving said material and ends along a path; opening said material along each stack while maintaining said material interconnected, removing said material from each stack and supporting said container ends; and arranging said stacks of container ends in end-to-end relation for delivery to a machine.

12. A method as defined in claim 11, in which stacks are positioned in side-by-side relationship and said opening includes severing said material transversely of said path and longitudinally of each stack.

13. A method as defined in claim 12, in which said severing is accomplished by cutting said material.

14. A method a defined in claim 12, in which said severing is accomplished by heating said material.

15. A method as defined in claim 11, in which said material comprises two sheets located on opposite sides of said stacks, with said sheets sealed longitudinally along opposite edges; and said opening includes removing said edges to expose said stacks.

16. A method as defined in claim 15, in which said sheets are sealed transversely between each of said spaced stacks and said opening includes severing one of said sheets between each of the respective seals, the further steps of collecting said edges and said sheets on at least one roll.

17. A method of packaging container ends and other nestable articles which comprises the steps of: arranging said container ends in stacked face-to-face relation on support means; locating first and second sheets of flexible, sealable material on opposite sides of said stacks; and approaching opposite sides of and contacting said sheets with first and second sealing elements to seal said sheets together along opposite sides and on opposite ends of said stacks to encase said stacks while on the support means, said first and second heating elements being aligned together on opposite sides of said sheets adjacent said support means and relatively movable toward and away from each other, with at least one of said sealing elements being a heat sealing element.

18. A method of packaging as defined in claim 17, in which the container ends are arranged in a plurality of transversely spaced stacks and said sheets are sealed at spaced locations between each pair of adjacent stacks.

19. A method of packaging as defined in claim 18, extending said sheets a considerable distance beyond one edge of an endmost stack to produce a leader for use in unpackaging said ends including the additional step of.

20. A packaging system for nestable articles such as container ends comprising means for delivering a continuous supply of articles in face-to-face relation along a path; support means adjacent said path for receiving a plurality of said articles; delivery means for sequentially delivering stacks of articles in face-to-face relation to said support means; means for feeding a first sheet of sealable material between said support means and said stack of articles; means for delivering a second sheet in superposed relation to said stacks; and securing means sealing said sheets on opposite sides and opposite ends of each of said stacks whereby to encase said stacks while on the support means with said sheets producing an interconnection between adjacent stacks, said securing means comprising first and second sealing elements aligned together on opposite sides of said sheets adjacent said support means and relatively movable toward and away from each other, with at least one of said sealing elements being a heat sealing element.

21. A packaging system as defined in claim 20, in which said support means includes a member having a plurality of spaced article receiving pockets; and drive means for said member to locate successive pockets at a receiving station.

22. A packaging system as defined in claim 22, in which said member comprises a drum having said pockets on the peripheral surface thereof and rotatable about a fixed axis.

23. A packaging system as defined in claim 20, in which said heat sealing element comprises a die having a continuous heated surface for simultaneously heat sealing said sheets together along opposite sides and ends of each of said stacks.

24. A packaging system as defined in claim 20, in which said first and second sealing elements each have a continuous heated surface.

25. An article handling system for a plurality of nestable articles such as container ends comprising means for delivering a continuous supply of said articles in face-to-face relation along a path; means for encasing a plurality of stacks of said articles at spaced locations in side-by-side relation between first and second sheets at a first location adjacent said path, said sheets maintaining a connection between said plurality of stacks; and means at a second location spaced from said first location for removing said plurality of stacks from said sheets and arranging said plurality of stacks in end-to-end relation to produce a continuous supply of said articles at said second location.

26. An article handling system as defined in claim 25, in which said means at a second location comprises feed means for delivering successive stacks of articles to a station; means for severing at least one of said sheets at said station to accommodate removal of said articles; and means for collecting said sheets for disposal.

27. An article handling system as defined in claim 26, in which said feed means comprises a drum having a plurality of pockets at circumferentially spaced locations and each adapted to receive and support a stack of articles and drive means for locating successive pockets at said station each of said pockets being adjacent said means for severing when located at said station.

28. An article handling system as defined in claim 26, in which said means for severing includes first cutting means for continually removing opposite edges of each of said sheets extending beyond opposite ends of said stacks, and second cutting means for severing only one of said sheets transversely along each of said stacks.

29. An article handling system as defined in claim 28, in which said means for encasing comprises a drum having a plurality of spaced pockets formed on the peripheral surface thereof; means for continually supplying said first and second sheets in superposed relation adjacent said drum, with opposite edges extending beyond opposite ends of said pockets; means for intermittently delivering stacks of articles between said sheets to said pockets at a first position and means for sealing each of said stacks between said sheets at a second position.

30. An article handling system as defined in claim 28, in which said means for encasing includes a die having first and second relatively movable elements; support means for a stack of articles between said elements; means for continually supplying said first and second sheets between said elements; means for intermittently delivering stacks of articles from said path between said sheets to said support; and means for sealing said sheets together around each of said stacks.

31. A container end handling apparatus for unpackaging a plurality of elongated stacks of container ends encased in side-by-side spaced relation in a flexible film having an encompassing portion for each stack and a connecting portion adjacent stacks comprising first means for feeding said stacks and film along a path; second means for severing the encompassing portion of said film for each stack in a manner that the adjacent connecting portions remain interconnected; third means for delivering said stacks to a second path wherein all of said stacks are in end-to-end relation; and collecting means for collecting said film.

32. A container end handling apparatus as defined in claim 31, in which said first means includes a drum defining a peripheral surface having circumferentially spaced axially extending pockets defined therein, each of said pockets adapted to receive a stack of container ends; and means for rotating said drum.

33. A container end handling apparatus as defined in claim 31, in which said severing means comprises a cutter and means for moving said cutter transversely of said path.

34. A container end handling apparatus as defined in claim 31, in which said severing means comprises a first heated element extending transversely of said path and disposed in the path of movement of said encompassing portions; and a second heated element located on opposite ends of said stacks to remove the opposite edges of said film.

35. A container end handling apparatus as defined in claim 31, in which said means for severing is a single means for severing a single layer of said flexible film.

36. An article handling system as defined in claim 25, in which said means at a second location comprises means for delivering successive stacks of articles to a station; means for severing only one of said sheets transversely along each of said stacks, to accommodate removal of said articles, in a manner that said connections between said stacks remain interconnected; and means for collecting said sheets for disposal.

* * * * *